No. 719,904. PATENTED FEB. 3, 1903.
F. W. TAYLOR & W. H. SARGENT.
RELIEVING GEAR FOR SCALES.
APPLICATION FILED JUNE 20, 1902.

NO MODEL. 2 SHEETS—SHEET 1.

WITNESSES:
INVENTORS
F. W. Taylor
W. H. Sargent
ATTORNEYS

UNITED STATES PATENT OFFICE.

FREDERICK W. TAYLOR AND WILLIS H. SARGENT, OF ST. JOHNSBURY, VERMONT, ASSIGNORS TO THE E. & T. FAIRBANKS & COMPANY, OF ST. JOHNSBURY, VERMONT, A CORPORATION OF VERMONT.

RELIEVING-GEAR FOR SCALES.

SPECIFICATION forming part of Letters Patent No. 719,904, dated February 3, 1903.

Application filed June 20, 1902. Serial No. 112,454. (No model.)

*To all whom it may concern:*

Be it known that we, FREDERICK W. TAYLOR and WILLIS H. SARGENT, citizens of the United States, residing at St. Johnsbury, in the county of Caledonia, State of Vermont, have invented certain new and useful Improvements in Relieving-Gear for Scales, of which the following is a description, reference being had to the accompanying drawings and to the letters of reference marked thereon.

Our invention relates to an improvement in weighing-scales, and particularly to a relieving-gear for raising the platform from the pivots, so as to relieve the knife-edges of the pivots from wear due to the passing of the loads across the platform when it is not desired to weigh such loads—as, for example, when a scale is supported in the street or driveway.

The invention as herein shown is applied to a trussed lever-scale of the Fairbanks type; but it will be understood that so far as the features of invention are concerned it may be applied to other forms of scales, and not only to wagon-scales, but to railway-track scales as well.

The invention consists in certain details of construction or arrangement of parts, as hereinafter described, and referred to in the appended claims.

Figure 1:
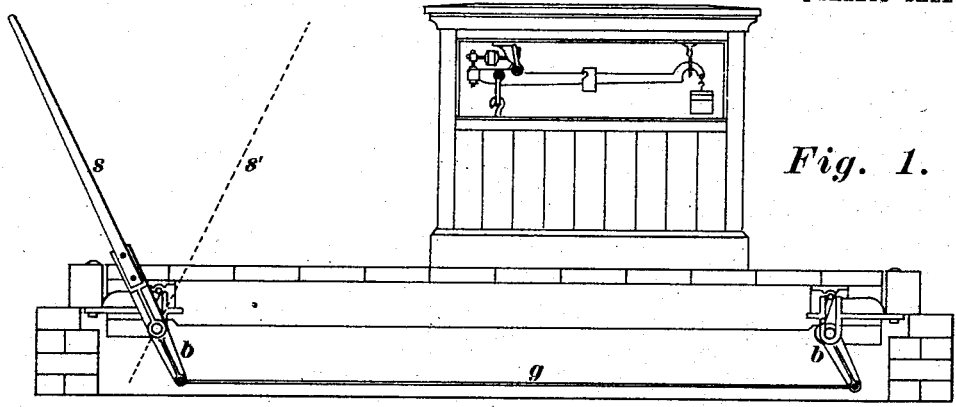
Figure 2:
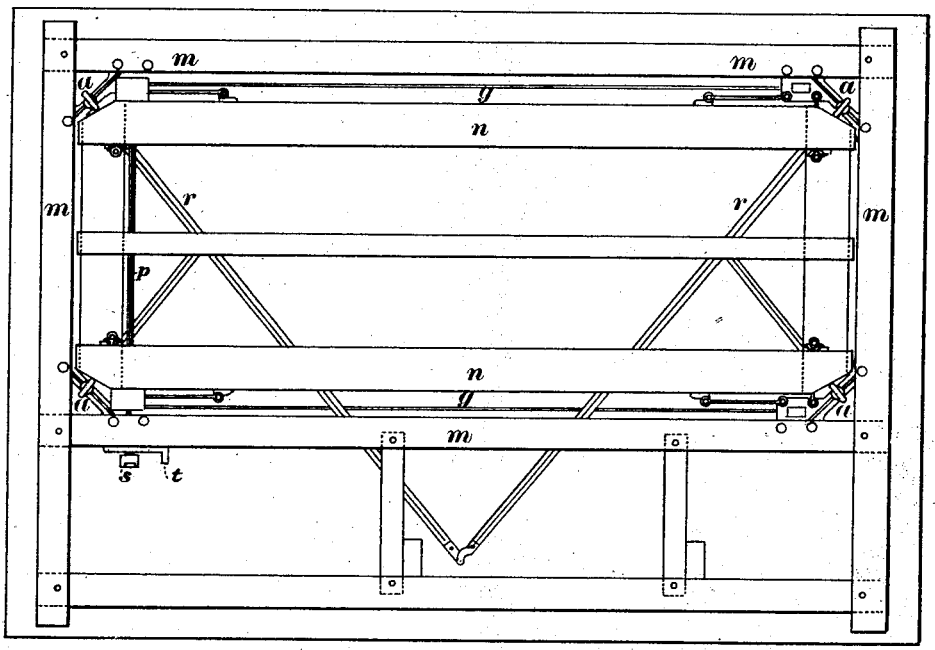
Figure 3:
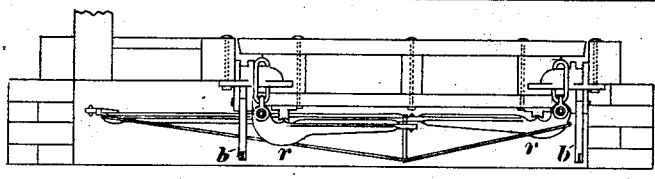
Figure 4:
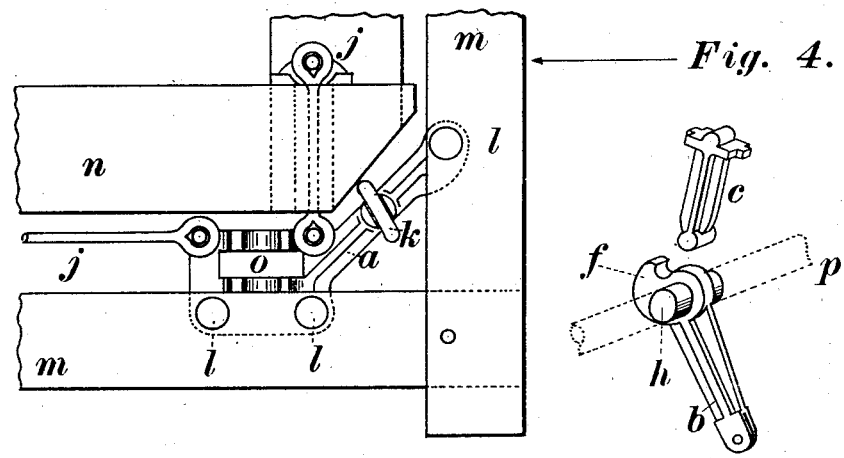
Figure 5:
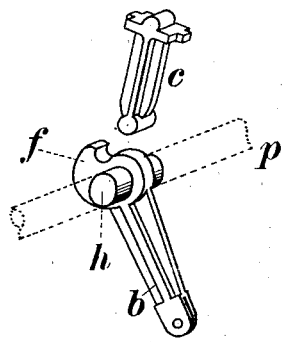
Figure 6:
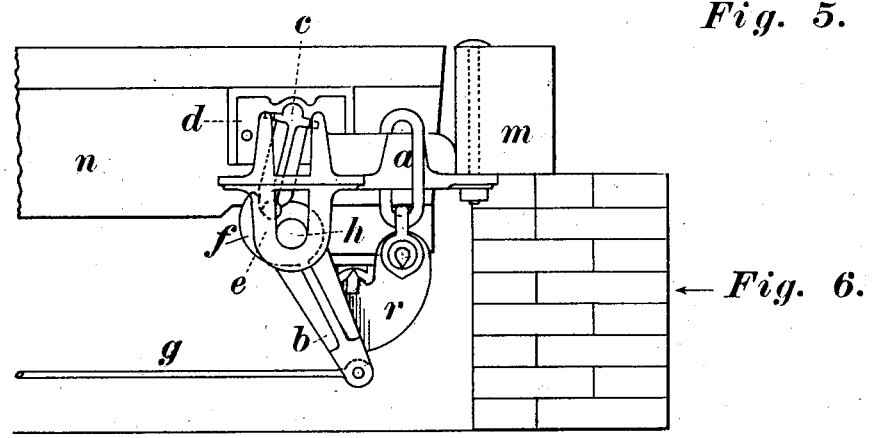

In the accompanying drawings, which illustrate the invention, Figure 1 is a front elevation embodying the improvements. Fig. 2 is a plan view. Fig. 3 is a side view of Fig. 1 with certain of the parts removed. Fig. 4 is an enlarged plan view of one corner of the scale, shown in Fig. 2. Fig. 5 is a detail view showing the lever and link for raising the platform. Fig. 6 is an enlarged front elevation of one corner of the scale, showing the position of the parts when the scale is adapted to weigh the load upon it; and Fig. 7 is a similar view showing the position of the parts when the platform is raised from its knife-edged pivots.

The framework of the scale is of the usual construction, composed of the timbers $m$, suitably supported upon masonry-work.

$r$ represents the levers, hung in the usual manner from loops $k$ upon the corner-irons $a$, which latter are of the usual construction, except for the fact that they are provided with a socket $e$ for the reception of the trunnion $h$ of the lever $b$, which lever passes down through an opening $o$ in the corner-iron. The lever $b$ is provided with a crescent-shaped projection $f$, the concave side of which receives the lower end of a link $c$, the upper part of the link being rounded to fit within a socket in the bearing-plate $d$, attached to the platform. The upper end of the link $c$ has lugs engaging between four posts on the corner-irons, by which the link $c$, when the lever $b$ is swung, rises and falls in a vertical direction.

Figure 7:
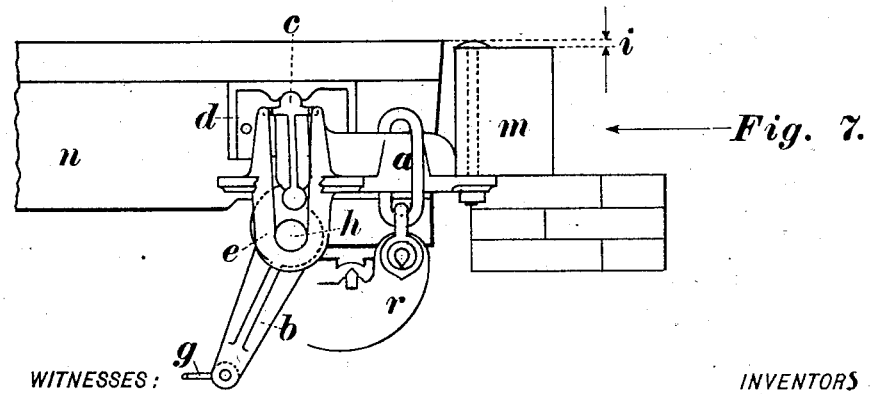

As shown in Figs. 1 and 2, upon the left-hand side the levers $b$ $b$ are connected by a shaft $p$, to which is attached a hand-lever $s$, said levers being connected in pairs by rods $g$ $g$, so that when the shaft is turned by the handle all four levers move in unison, and when turned, as shown in Fig. 7, the link rises until it engages the bearing-plate $d$ and then lifts the platform $n$ until it clears the levers $r$. The shaft $p$ is provided with a bearing $t$, which receives the side thrust of the operating-lever, and to this may be attached a stop to limit the throw of the lever.

Having thus described our invention, what we claim, and desire to secure by Letters Patent, is—

1. In a platform-scale provided with suitable corner-irons, scale-levers hung therefrom, platform-operating levers pivoted upon said corner-irons, links supported at one end by said levers and said links at their opposite end bearing upon the platform, with means for swinging said platform-levers, whereby the platform may be raised and lowered; substantially as described.

2. In a relieving-gear for scales, the combination with the corner-irons and the levers $b$ having a recessed upper surface, links $c$ at their lower ends fitting the recesses in the levers $b$, bearing-plates on the platform provided with recesses to receive the upper ends of the links, said links $c$ having projections guided in ways upon the corner-irons; substantially as described.

3. In a device of the character described, a suitable platform, a corner-iron provided with a bearing for a platform-operating lever, and provided with guiding-ways for a link adapted to be brought into engagement with the platform; substantially as described.

4. In a scale of the character described, a platform provided with bearing-plates, links $c$ seated at their upper ends in said bearing-plates, corner-irons provided with guideways for said links, and pivoted levers $b$ adapted to raise and lower said links; substantially as described.

In testimony whereof we affix our signatures in presence of two witnesses.

FREDERICK W. TAYLOR.
WILLIS H. SARGENT.

Witnesses:
FRANK O. FRENCH,
IDA L. BECK.